Patented Jan. 31, 1928.

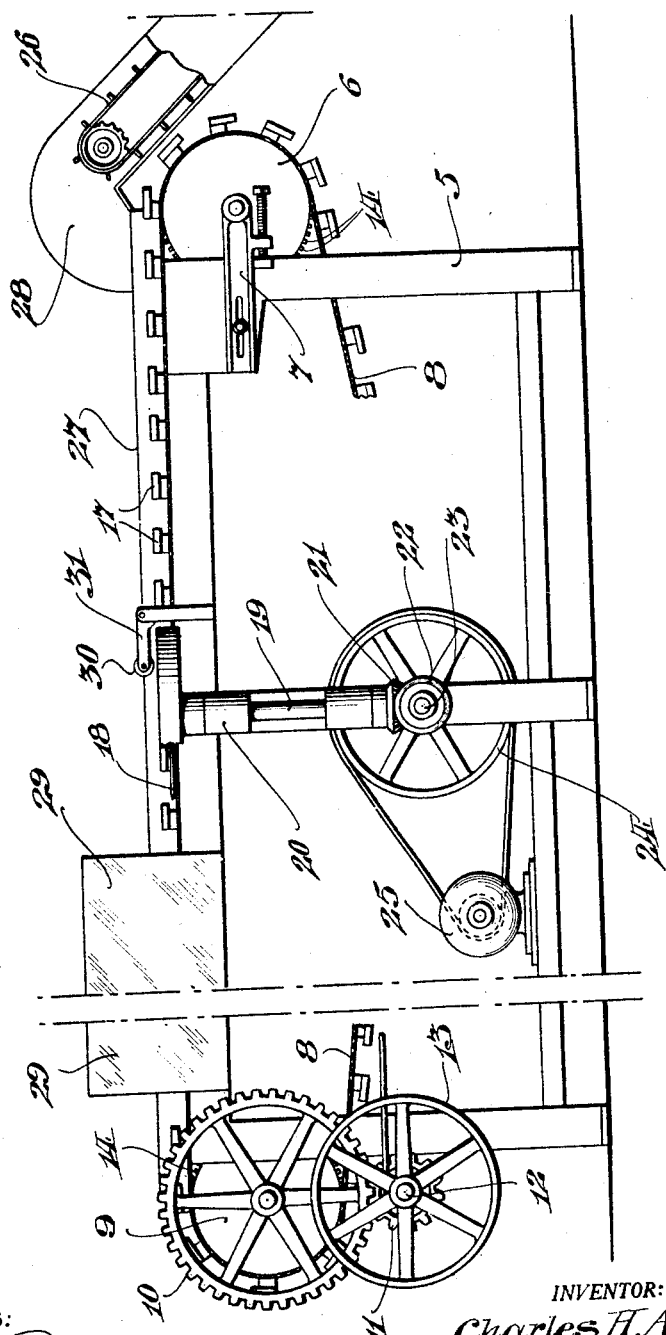

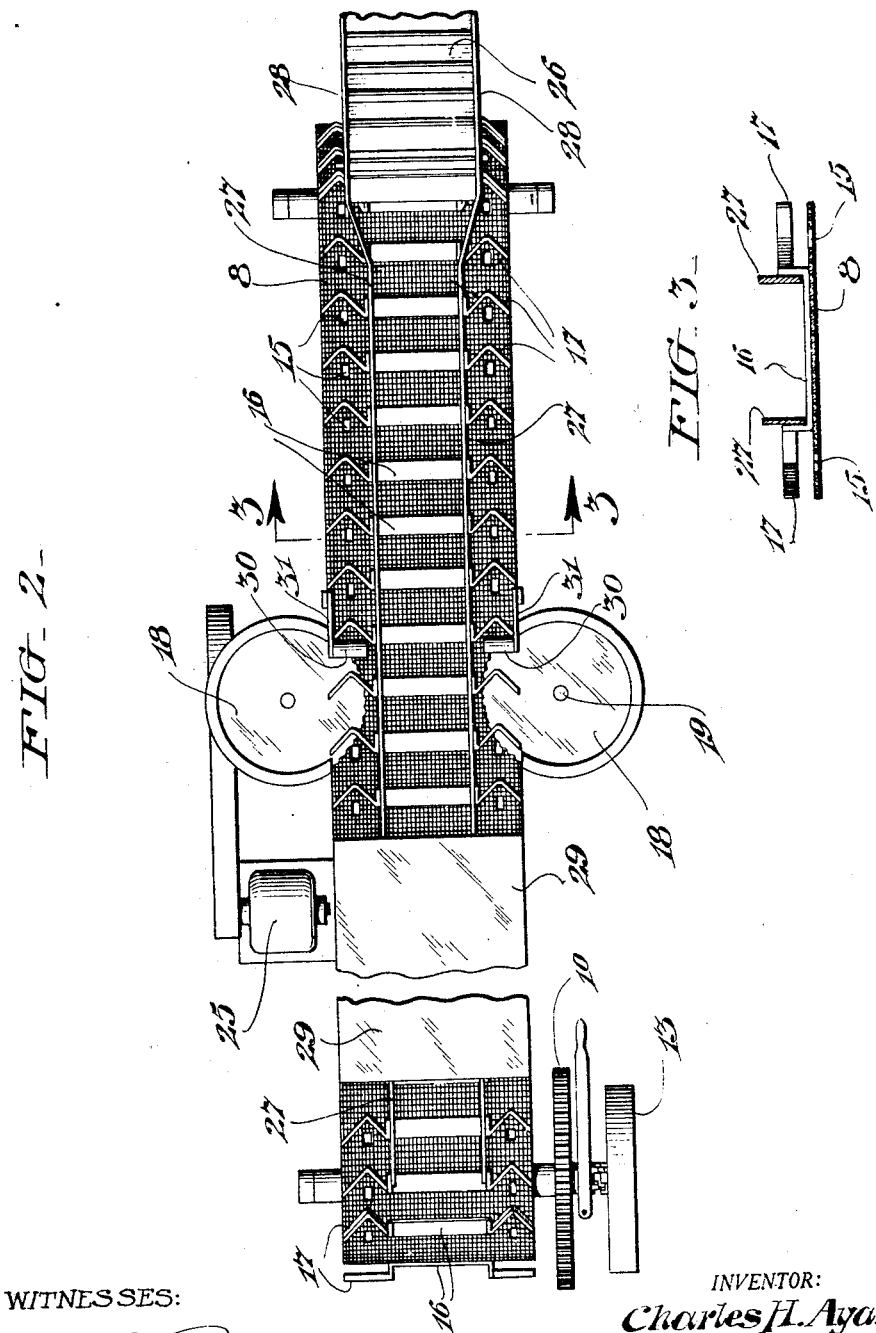

1,657,775

UNITED STATES PATENT OFFICE.

CHARLES H. AYARS, OF SALEM, NEW JERSEY.

TOMATO TRIMMER.

Application filed February 9, 1927. Serial No. 166,867.

My invention relates to machines for preparing fruit for canning and is particularly designed for removing the stems and butts from tomatoes.

In canning the whole tomato, it is essential that the stems and hard part of the butt be removed and that this be accomplished without rupturing the seed bags.

This end was not obtained prior to my development of the machine illustrated and described in my application for patent, Serial No. 78,560, filed December 31, 1925, and the present invention is an improvement on that machine.

One of the objects of my invention is to provide a machine having a conveyor belt on which the fruit may be mechanically dumped and carried; means being provided to retain the fruit on the central part of the belt from where fruits may be selected by the operators and placed in position for trimming while the smaller fruits are carried onward to be worked up into other products.

Another object of my invention is to provide improved retainers for holding tomatoes in position during the trimming operation and to provide means for keeping these tomatoes from coming in contact with those on the central part of the belt.

These objects, and other advantageous ends which will be described hereinafter, I attain in the following manner, reference being had to the accompanying drawings in which Figure 1 is a side elevation of a machine embodying my invention, and Figure 2 is a top plan view thereof, certain parts of the machine having been omitted for the sake of simplicity, Figure 3 is a section through the conveyor belt taken on the line 3—3 on Figure 2, showing my improved retainer in elevation.

Referring now more in detail to the drawings, in which only sufficient parts of the machine have been illustrated to properly describe my invention, 5 represents the frame of the machine on one end of which a roller 6 is rotatably mounted in an adjustable bearing 7. An endless conveyor belt 8 is carried by roller 6 and by a roller 9 mounted on the opposite end of frame 5 and actuated by any suitable means, as by a gear 10 rigidly connected to roller 9 and meshing with a pinion 11 mounted on a shaft 12 which carries a pulley 13 to which power may be applied from any suitable source. Belt 8 is preferably made of woven wire and movement is imparted thereto by a series of pins 14 rigidly secured in roller 9 and adapted to engage the mesh of the belt. Roller 6 is also provided with pins 14 which engage the mesh of belt 8 and tend to keep the upper half of the belt taut, due to the weight of its lower half which is allowed to sag in the usual manner.

At intervals along each edge of belt 8, openings 15 are formed by clipping some of the wires which compose the belt and bending the free ends thus produced back into the mesh. Openings 15 are spaced a suitable distance apart and the openings in one row are preferably directly opposite openings in the opposite row. Retainers 16 are bolted to belt 8 between the two rows of openings 15 and are provided with hook shaped wings 17 which are spaced above the top of belt 8 and each partially surrounds an opening 15. Retainer 16 may be formed in any desired manner but is preferably a casting with wings 17 integral.

Positioned at each side of and overlapping belt 8 is a rotary cutting disk 18 fixed to a shaft 19 mounted in an elongated bearing 20 and provided with a bevel pinion 21. Bevel pinions 22 mesh with bevel pinions 21 and are fixed to a shaft 23 rotatably mounted in frame 5 and rotated in any suitable manner, as by a pulley 24 belted to a motor 25. The machine is arranged to rotate disks 18 at a high speed so that their cutting edges, which are preferably notched, may sever the butts from the tomatoes without mangling the tender fruit.

A conveyor 26 is secured to one end of frame 5 and is adapted to deliver tomatoes onto belt 8. In order to retain the tomatoes on the central portion of the belt, a guide 27 is disposed slightly above the top of the belt and has one end secured to the frame 28 of conveyor 26 and is supported near its other end by being secured to the frame of a scalding chamber 29; the ends of the guides extending beyond the scalding chamber to a point above the center of roller 9.

In preparing tomatoes for canning, they are first washed, preferably in a washing machine which is not shown in the drawings and from which they are removed by conveyor 26 and dumped onto belt 8 between guides 27. Operators are positioned at either side of belt 8 between the end of conveyor 26 and cutting disks 18 so that they may select the better tomatoes from those on the central part of the belt and place them within wings 17; in which position openings 15 accommodate the stems of the tomatoes. Belt 8 is continually moving toward cutting disks 18 so that the tomatoes in wings 17 are brought in contact with the cutting edge of the disks. A roller 30, which is pivoted on an arm 31, engages the upper side of the tomato at this point and gently rides over the fruit during the greater part of the cutting operation so that the tomato is held gently yet firmly against upward movement by the action of the disk.

After passing the cutting disks, the tomatoes are carried onwardly through scalding chamber 29 where they are subjected to a scalding process for the purpose of loosening the skins. From the scalding chamber, they pass onwardly to a point above roller 9 where they are removed in any suitable manner. The smaller and irregular shaped tomatoes are allowed to remain between guides 27 and are carried through scalding chamber 29 and then removed from the end of the conveyor in any suitable manner, after which they are made into ketchup or other products.

Scalding chamber 29 has not been illustrated or described as it forms no part of this invention, but is mentioned in connection with the operation of the machine as it is customary to scald tomatoes prior to their preparation for food and, in this way, the scalding operation is carried on concurrently with the trimming operation.

While I have illustrated and described an embodiment of my invention, it will be readily understood that modifications might be made without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A fruit trimmer including an endless conveyor having a woven wire belt with openings along its edges for accommodating the stems of the fruit, rotary cutting disks adapted to sever the butts, retaining pieces secured to the belt for holding the fruit against displacement during the trimming operation, and means for imparting motion to the belt and cutting disks.

2. A fruit trimmer including an endless conveyor having a woven wire belt with openings along its edges for accommodating the stems of the fruit, rotary cutting disks adapted to sever the butts, retaining pieces secured to the belt for holding the fruit against displacement during the trimming operation, guides disposed above the belt whereby a supply of fruit may be carried on the central portion of the belt, and means for imparting motion to the belt and cutting disks.

3. A fruit trimmer including an endless conveyor having a woven wire belt with openings along its edges for accommodating the stems of the fruit, rotary cutting disks adapted to sever the butts, retaining pieces secured to the belt for holding the fruit against displacement during the trimming operation, a pivotally mounted arm carrying a roller disposed above the engaging edge of the cutting disk and adapted to ride on a fruit approaching the disk, guides disposed above the belt whereby a supply of fruit may be carried on the central portion of the belt, and means for imparting motion to the belt and cutting disks.

4. A fruit trimmer including an endless conveyor belt adapted to receive a supply of fruit and having openings adapted to accommodate the stems of the fruit, a guide disposed above said belt for keeping the supply of fruit away from said openings, a rotary cutting disk adapted to sever the butts, means for holding the fruit against displacement during the trimming operation, and means for imparting motion to the conveyor belt and cutting disk.

5. A fruit trimmer including an endless conveyor belt adapted to receive a supply of fruit and having openings adapted to accommodate the stems of the fruit, a guide disposed above said belt for keeping the supply of fruit away from said openings, a rotary cutting disk adapted to sever the butts, retainers adjacent the openings for holding the fruit against displacement during the trimming operation, a pivotally mounted arm carrying a roller disposed above the engaging edge of the cutting disk and adapted to ride on a fruit approaching the disk, and means for imparting motion to the conveyor belt and cutting disk.

6. In combination with a fruit trimming machine having an endless belt, a retainer for holding the fruit against displacement during the trimming operation including a channel shaped body portion and a hook shaped wing formed on each flange of the body portion; the bottoms of the hook shaped portions being at a higher level than the bottom of the body portion.

7. A fruit trimmer including an endless conveyor with openings along its edges for accommodating the stems of the fruit, rotary cutting disks adapted to sever the butts, retaining pieces secured to the conveyor for holding the fruit against displacement during the trimming operation, and means for imparting motion to the belt and cutting disks.

In testimony whereof I have signed my name to this specification.

CHARLES H. AYARS.